O. R. KELLER.
GAME.
APPLICATION FILED NOV. 27, 1914.
1,170,821.
Patented Feb. 8, 1916.
3 SHEETS—SHEET 1.
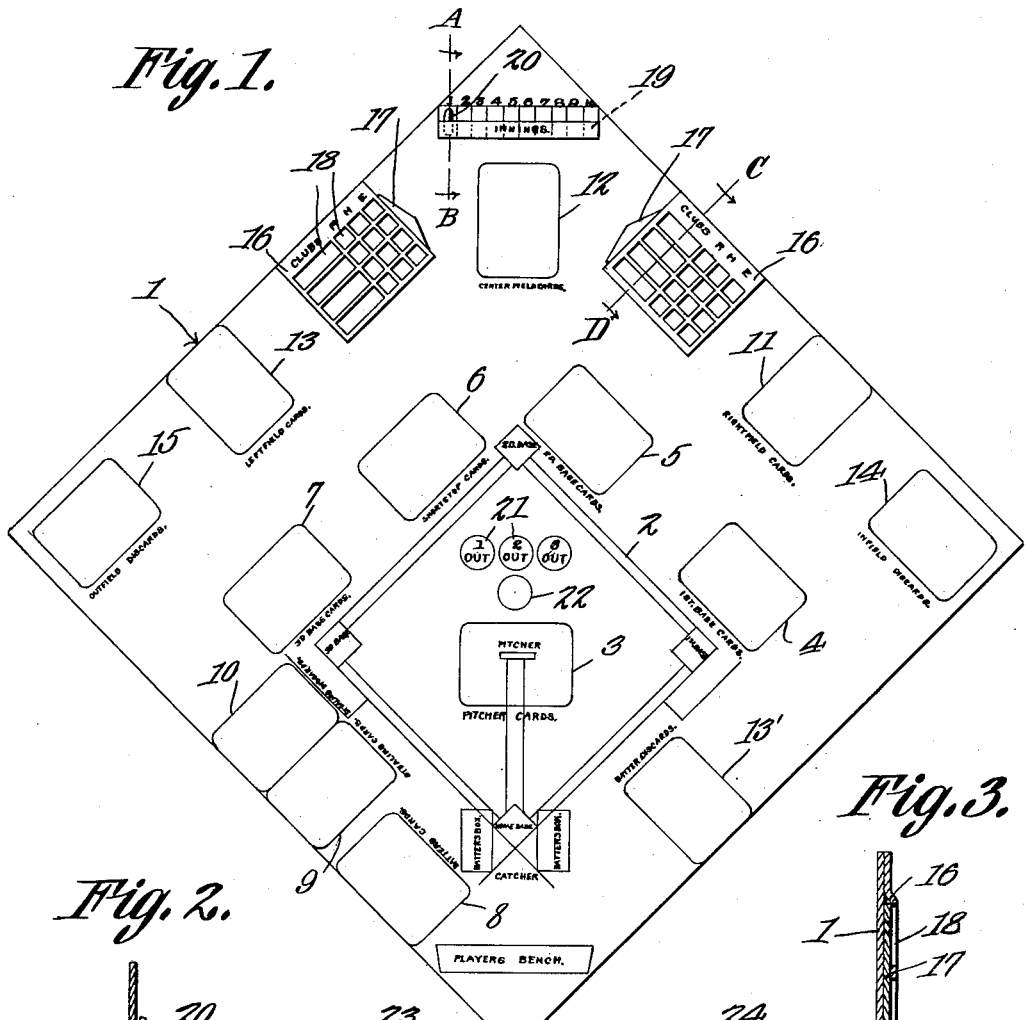
Fig. 1.
Fig. 2.
Fig. 3.
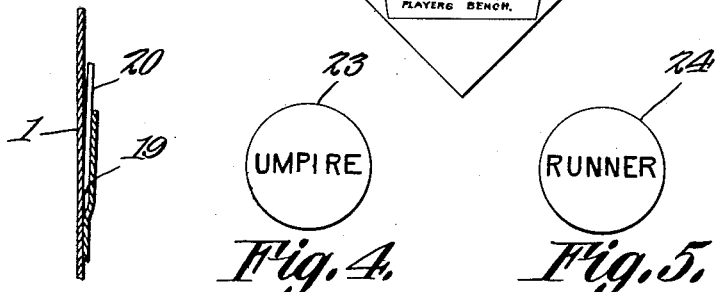
Fig. 4. Fig. 5.
Orlando R. Keller, Inventor
Witnesses
by C. A. Snow & Co.
Attorneys.

O. R. KELLER.
GAME.
APPLICATION FILED NOV. 27, 1914.
1,170,821.
Patented Feb. 8, 1916.
3 SHEETS—SHEET 2.
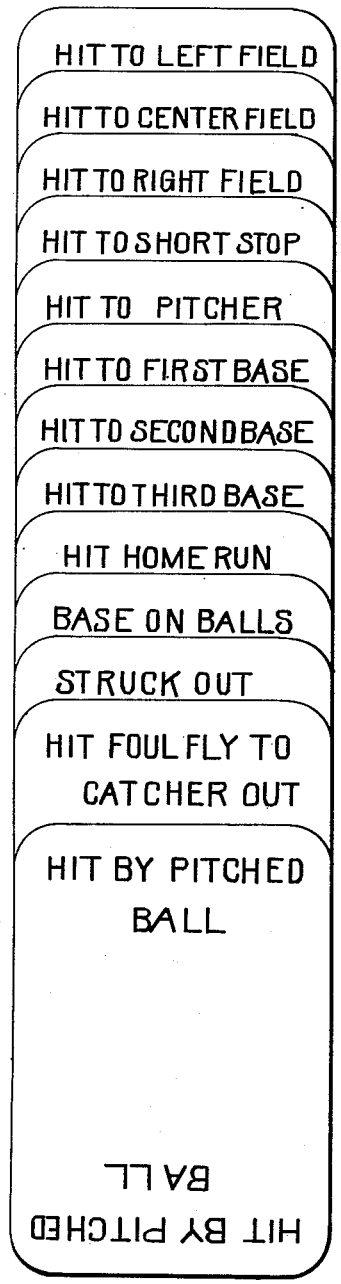
Fig. 6.
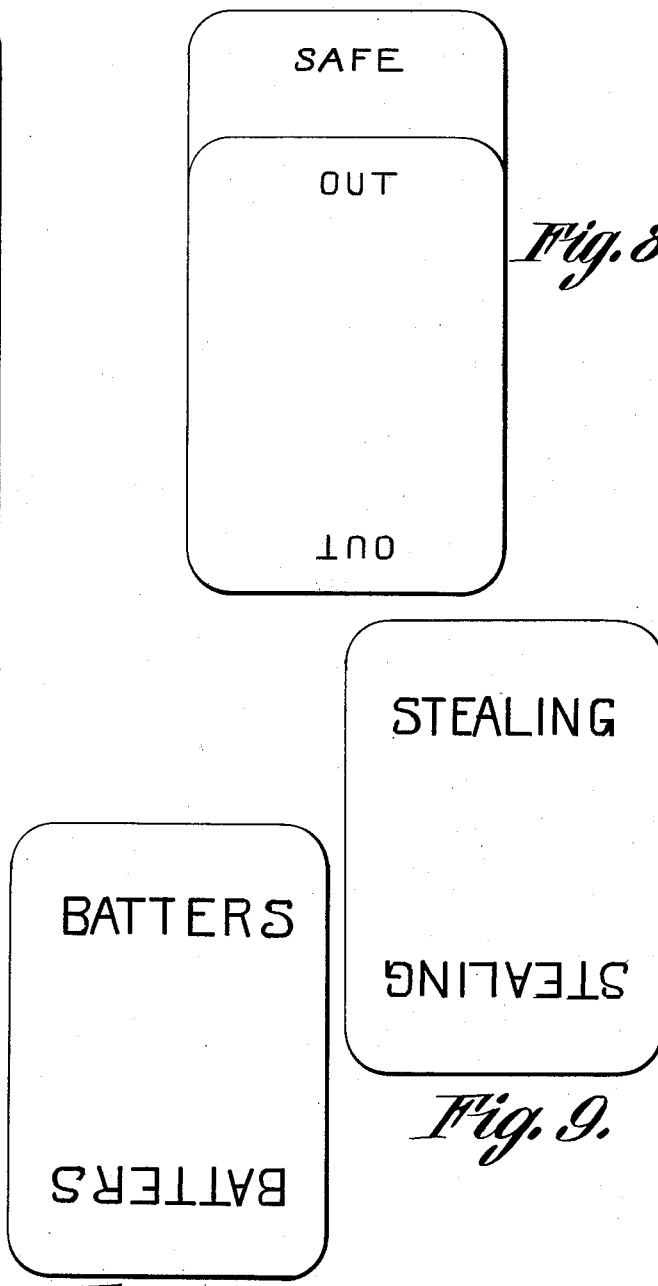
Fig. 8.
Fig. 7.
Fig. 9.
Orlando R. Keller
Inventor,
by C. A. Snow & Co.
Attorneys.
Witnesses

O. R. KELLER.
GAME.
APPLICATION FILED NOV. 27, 1914.

1,170,821.

Patented Feb. 8, 1916.
3 SHEETS—SHEET 3.

Orlando R. Keller, Inventor,
by C. A. Snow & Co.
Attorneys.

Witnesses

UNITED STATES PATENT OFFICE.

ORLANDO R. KELLER, OF PORTSMOUTH, OHIO.

GAME.

1,170,821.  Specification of Letters Patent.  Patented Feb. 8, 1916.

Application filed November 27, 1914. Serial No. 874,267.

*To all whom it may concern:*

Be it known that I, ORLANDO R. KELLER, a citizen of the United States, residing at Portsmouth, in the county of Scioto and State of Ohio, have invented a new and useful Game, of which the following is a specification.

This invention relates to games, one of its objects being to provide a board and cards for use in connection therewith, whereby a game corresponding with that of baseball can be played, it being possible, by means of the various cards, to execute all of the various plays in baseball, it being impossible to determine the ultimate result of a play until the final position of the ball has been indicated.

A further object is to provide a series of cards representing the possible plays, these cards being distributed to the different positions upon the board or "field," the cards representing the batters having designations thereon indicating the point to which the ball is hit, "Strike-outs," "Hit by pitcher," etc., while the cards stacked at the different players' positions upon the field indicate the various plays which are possible by the pitcher, infielders and outfielders when the ball is received by them.

A further object is to combine with the board a means for keeping score.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 10:
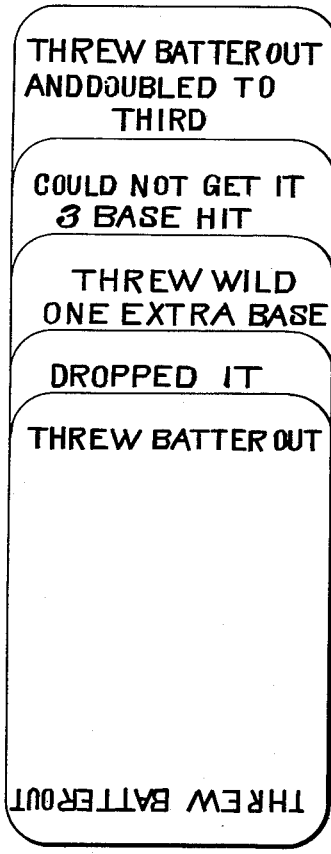
Figure 12:
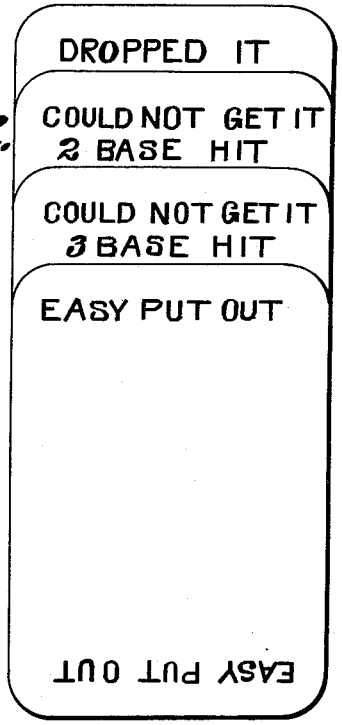
Figure 11:
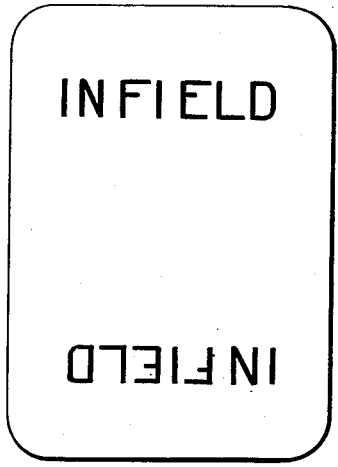
Figure 13:
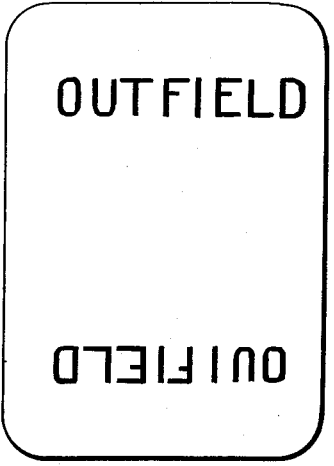

In said drawings: Figure 1 is a plan view of a board on which the game is to be played. Fig. 2 is an enlarged section on line A—B Fig. 1. Fig. 3 is an enlarged section on line C—D Fig. 1. Fig. 4 is a detail view of one of the game pieces. Fig. 5 is a detail view of another game piece. Fig. 6 is a detail view of some of the cards of the "batter's" suit. Fig. 7 is a back view of one of the cards of the "batter's" suit. Fig. 8 is a detail view of two of the cards of the "stealing" suit. Fig. 9 is a back view of one of the cards of the "stealing" suit. Fig. 10 is a detail view of some of the cards of the "infield" suit. Fig. 11 is a back view of one of the cards of the "infield" suit. Fig. 12 is a detail view of certain of the cards of the "outfield" suit. Fig. 13 is a back view of one of the "outfield" cards.

Referring to the figures by characters of reference 1 designates the game board which is preferably square and can be made to fold like the usual game board or can be made in any other form desired. Outlined upon this game board adjacent one corner is a representation of a baseball "diamond" 2 having the various infield positions properly indicated thereon. A rectangle designated at 3 is located about the pitcher's position in the "diamond," this rectangle being designated by the words "Pitcher cards." Another rectangle is arranged adjacent the first baseman's position, as shown at 4 and has the designation "1st base cards". Additional rectangles designated 5, 6, 7 and 8 are located at second base, short stop, third base and home base, and are designated respectively "2d base cards", "Short stop cards", "3d base cards", and "Batter's cards". Adjacent the rectangle 8 is provided another rectangle 9 designated by the words "Stealing cards" and beside this rectangle is another rectangle 10 having the designation "Stealing discards".

Rectangles designated at 11, 12 and 13 are arranged on the outfield portion of the board and have the respective designations "Rightfield cards", "Centerfield cards" and "Leftfield cards". Additional rectangles 14 and 15 are provided in the corners of the board adjacent the 1st base and 3d base positions and are designated "Infield discards" and "Outfield discards" respectively.

Arranged on the board at opposite sides of the rectangle 12 are pockets 17 each of which is designed to receive a removable card 17. The front of each pocket is provided with openings 18 arranged in columns so that the card in the pocket is exposed through these openings and the score of the game can be entered on the card. One column of openings has the heading "Clubs" while the other columns of openings have the headings "R", "H", and "E", indicating runs, hits and errors.

Arranged on the board 1 at that corner thereof back of the centerfield position is a transverse series of small pockets 19 and above these pockets are arranged numerals to indicate the innings of the game. A pointer 20 is adapted to be placed in any one of the pockets so as to designate the numeral thereabove.

Back of the rectangle 3 and within the "diamond" 2 are three circles 21, one of which has the designation "1 out" while the second has the designation "2 out", and the third has the designation "3 out". Another circle 22 is formed in the diamond and is adapted to receive the game piece 23 on which is printed or otherwise indicated the word "Umpire". Circular game pieces 24 having the word "Runner" thereon are used for the purpose of indicating the positions of the runners upon the "diamond". These game pieces 23 and 24 can be provided with pictures of famous baseball players and can be of any shape and size desired. It is to be understood that any suitable number of game pieces 24 may be employed.

The cards used in connection with the game board are in four suits, to wit, the "batter's" suit, the "stealing" suit, the "infield" suit, and the "outfield" suit. All the cards of each suit will have similar backs. For example in the "batter's" suit the back of each card can be provided with the word "batters" adjacent each end or a picture of a famous baseball player in a batting position can be printed on each card of the suit, all of the pictures being the same. Other appropriate pictures can be placed on the backs of the cards of the other suits. For example the "stealing" suit can have a picture of a player stealing a base, the "infield" suit can have a picture of a famous infielder in position, and the "outfield" suit may have a picture of a famous outfielder in position.

Any desired number of cards can be provided for all of the different plays possible by that each suit contain cards indicating all possible plays in the position to which the suit belongs. For example, on the faces of the cards belonging to the "batter's" suit will appear such designations as "Hit to pitcher", "Hit to first base", "Struckout", and other like plays, certain of which have been shown in Fig. 6. The cards of the "stealing" suit are designated on their faces by either the word "Out" or the word "Base".

The cards of the "infield" suit are provided for all of the different plays possible by an infielder. For example, one of the cards of the suit bears upon its face the words "Threw batter out", another card has the words "Dropped it". Various other plays are indicated on the different cards and certain of these have been illustrated in Fig. 10. The same arrangement is followed in the "outfield" suit, the designations on the faces of the cards indicating all possible plays that can be made by an outfielder.

In playing the game the cards of each suit are thoroughly shuffled. The "batter's" suit is then placed intact upon the rectangle 8 and the stealing suit is placed intact upon the rectangle 9. The cards of the infield suit are then dealt out one at a time to the five infield positions indicated at 3, 4, 5, 6, and 7 until all of the infield cards have thus been distributed. The cards of the outfield suit are then dealt out to the outfield positions 11, 12 and 13 until they have all been distributed. The first player, representing one club, removes the top card from the batter's suit and by turning it over, so as to see the face thereof, can determine what play the batter has made. If the card states "Struck out," then the game piece representing the first player is placed in the first space 21 indicating that one is out. The player, after placing the discard with its face up in the rectangle 13′ provided on the board for "batter discards," removes the second card from the batter's suit and by turning it over can find out the play made by the second batter. Should the said card state "Hit to second base," the player after placing the discard on the space 13′, removes the top card from the 2d base position 5. This card will contain one of several plays which may be made by the 2d baseman. For example, the card may state "Dropped it." This would indicate an error on the part of the 2d baseman and would leave the runner safe at 1st. A game piece 24 would thus be placed on 1st base. After the second base discard has been placed on the space 14, the player removes the next card from the batter's suit and should this card indicate "Hit to 2d base," the player removes the top card from the second base position and should this card read "Threw batter out and doubled to 3d," then it would be seen that a double play had been effected and both runners retired, thus completing one half the inning. At any proper time during the game the player may, if desired, state that it is his wish to sacrifice. After making this statement he removes the next card from the "batter's" suit and places it face up upon the space 13′ and advances the runner one base no matter what may have been the designation on the batter's card discarded by him. Even though the discarded batter's card may have entitled the batter to a "home run" or other long hit, the player is not allowed to avail himself thereof. A game piece is then put in one of the "out" spaces. Upon the completion of the first half of the inning, the other player takes possession of the batter's suit and begins to play the game as had the preceding player. It is to be understood that if, during any part of the game the player should desire to attempt a steal, it is merely necessary for him to remove one of the "stealing" cards from the suit and this card will indicate either "Safe" or "Out."

It is to be understood that the various hits, runs and errors can be entered in the proper spaces on the card 17 so that a complete score can thus be kept. As the game progresses, the indicator 20 can be shifted along the series of pockets 19 so as thus to designate the innings played. At any desired time during the progress of the game, the various cards can be removed, shuffled and replaced in the various positions on the board.

What is claimed is:—

A game including separate suits of cards for the respective infield and outfield positions on a baseball field, the cards of each suit having designated on one face the position in the field to which the cards belong, and on the opposite faces of the respective cards of each suit the various fielding chances and misplays that are possible at said position, another suit of cards representing a batter, the cards of said suit being marked on one side to indicate the suit to which they belong and, on the opposite sides of the respective cards of said suit being provided with designations of all possible plays and misplays of a batter, and another suit of cards designated to represent a player stealing and provided, on one face with designations as to whether the player stealing is safe or out.

In testimony that I claim the foregoing as my own, I have hereto affixed my signature in the presence of two witnesses.

ORLANDO R. KELLER.

Witnesses:
 IVY E. SIMPSON,
 HERBERT D. LAWSON.